United States Patent [19]

Scanga et al.

[11] 4,094,460
[45] June 13, 1978

[54] CLOSURE ASSEMBLY AND PACKAGE

[75] Inventors: Theodore P. Scanga, Lower Burrell; Robert E. Callender, Frazer Township, Allegheny County, both of Pa.

[73] Assignee: Aluminum Company of America, Pittsburgh, Pa.

[21] Appl. No.: 680,360

[22] Filed: Apr. 26, 1976

[51] Int. Cl.² ............................................. B65D 53/02
[52] U.S. Cl. ................................. 229/43; 215/232; 215/350; 215/352; 220/258; 229/5.8
[58] Field of Search .................. 229/43, 4.5, 5.5, 5.8, 229/5.7; 215/232, 350, 352; 220/258, 306; 206/467, 484, 306

[56] References Cited

U.S. PATENT DOCUMENTS

| B 337,023 | 3/1976 | Ray ................................. 215/232 |
| 2,257,919 | 10/1941 | Rutkowski ........................... 229/5.7 |
| 2,821,326 | 1/1958 | Fried ................................. 220/258 |
| 3,235,114 | 2/1966 | Blackwood et al. ................. 215/350 |
| 3,343,700 | 9/1967 | Heubl ................................. 215/344 |
| 3,391,847 | 7/1968 | Christine et al. ....................... 229/43 |
| 3,396,899 | 8/1968 | Strouse et al. ........................ 229/43 |
| 3,445,024 | 5/1969 | Whitney ............................... 215/40 |
| 3,892,351 | 7/1975 | Johnson et al. ......................... 229/43 |
| 3,921,805 | 11/1975 | Compere ............................... 206/532 |
| 3,924,746 | 12/1975 | Haines ................................. 206/484 |
| 3,930,589 | 1/1976 | Koontz ................................. 215/352 |
| 3,946,871 | 3/1976 | Sturm ................................. 229/43 |

FOREIGN PATENT DOCUMENTS 449,965 7/1936 United Kingdom .................. 215/352

*Primary Examiner*—William Price
*Assistant Examiner*—Bruce H. Bernstein
*Attorney, Agent, or Firm*—David W. Brownlee; David J. Hill

[57] ABSTRACT

A closure assembly is disclosed which includes a plastic sealing ring having an annular channel in it for receiving and sealing against the entrance mouth of a container, a metal foil liner spanning the sealing ring and a flexible plastic overcap which receives the sealing ring and foil liner therein. The foil liner has a heat seal coating on one or both faces for sealing to the sealing ring and, in some packages, to the plastic overcap. The three-piece closure assembly is positioned on the entrance mouth of a container and the foil liner is induction heated to soften the heat seal coating thereon to seal the liner to the sealing ring. Induction heating may also be employed to adhesively join the foil liner to the undersurface of the overcap and seal the sealing ring to a foil layer in the container body.

5 Claims, 4 Drawing Figures

CLOSURE ASSEMBLY AND PACKAGE

BACKGROUND OF THE INVENTION

1. Field of Art

This invention relates to a packaging system and in particular to a three-piece closure assembly for sealing containers made of paperboard, plastic or a composite of paper and metal foil among other materials.

2. Brief Description of the Prior Art

Fibrous composite containers are used in packaging numerous products including solids, liquids and semi-liquids. Some composite containers include a paperboard layer and inside and/or outside layers of metal foil. The metal foil layers are impervious to the packaged items and to the ambient surroundings and protect the contents of the container and/or the paperboard layer. Other fibrous containers which are used for packaging dry goods may be made of paperboard having no protective foil.

A number of closure systems are known for closing fibrous containers. For example, U.S. Pat. No. 3,892,351 discloses a composite tubular container body having an outwardly rolled top rim with a foil membrane type closure sealingly secured to the rolled rim and a plastic overcap secured on the container over the foil membrane. The foil membrane is heated by induction currents to seal it to the rolled rim. U.S. Pat. No. 3,396,899 discloses another system for sealing a fibrous container in which a heat regenerating adhesive is applied as an annular band on the top edge of the container with a foil liner secured to such band and a protective closure over the foil liner. The protective closure may be secured on the container by a pressure sensitive tape around the periphery of the closure. Another example of a system for sealing fibrous containers is disclosed in U.S. Pat. No. 3,353,739 in which a metal easy-opening end is seamed on the end of a composite container.

Sealing of fibrous containers is difficult due to the lack of flexibility of fibrous material such as paperboard and the irregularity of the edges of such container to which a closure is to be sealed. Rolling or otherwise deforming the edges of a fibrous container tends to wrinkle and damage the edges and therefore produces an uneven and sometimes degraded surface to which a closure must be sealed.

Induction heat sealing of containers is well known as is disclosed in a number of patents including U.S. Pat. Nos. 3,815,314; 2,937,481; 2,620,939 and 3,460,310. Many induction heat sealing systems involve the use of a foil membrane or liner having a heat seal resin on one or both sides thereof to facilitate sealing or securing the membrane to the entrance mouth of a container and to an overcap over the foil liner. Additional prior disclosures of interest are contained in U.S. Pat. Nos. 2,964,208; 3,325,034 and 3,445,024 which disclose plastic sealing rings which are adapted to be secured on the entrance mouth of a container to facilitate sealing a closure on such a container.

The prior art is lacking in a simple and reliable system for sealing fibrous containers at high speeds.

SUMMARY OF THE INVENTION

This invention provides a closure assembly which includes a plastic sealing ring having a channel in it for receiving and sealing against the entrance mouth of a container, a metal foil liner spanning the sealing ring and a flexible plastic overcap secured on the sealing ring over the foil liner. The foil liner has a heat seal coating on at least the surface thereof which contacts the sealing ring for induction heat sealing of the liner to the sealing ring. The plastic overcap may have an integral tab thereon for facilitating removal of the overcap from a sealed container. This invention also provides a container sealed with such a closure assembly.

Accordingly, an object of this invention is to provide an improved system for sealing fibrous or plastic containers.

Another object of this invention is to provide a three-piece closure assembly which includes a sealing ring, a foil liner and a plastic overcap which are adapted to be induction heat sealed on a fibrous or plastic container.

Other objects and advantages of this invention will be more fully understood and appreciated with reference to the following description and the drawings attached hereto.

DESCRIPTION OF PREFERRED EMBODIMENTS

Figure 1:
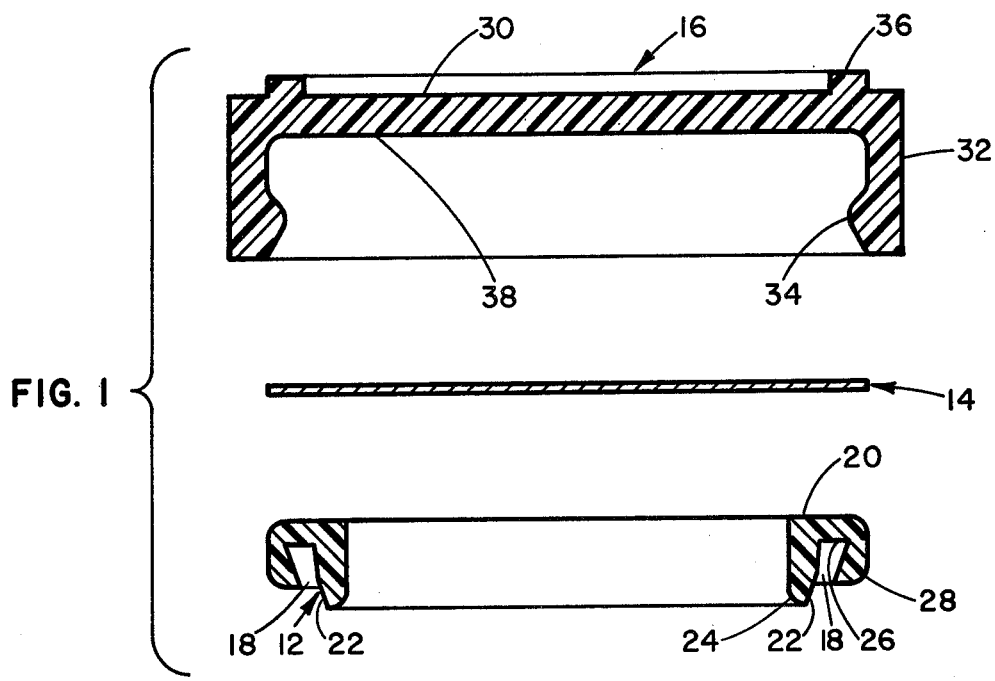
FIG. 1 is an exploded cross-sectional through the three pieces which comprise a closure assembly of this invention.

In accordance with this invention, a three piece closure assembly 10 is provided which includes a sealing ring 12, a metal foil sealing disc 14 and a flexible plastic overcap 16. The assembly is adapted to be induction heat sealed on fibrous containers at speeds of 100-300 containers per minute as is typical of many filling and sealing lines. The closure assembly 10 selected for illustration is for a cylindrical container and is therefore round with an annular ring 12 therein. For other container shapes such as oval or generally rectangular, the shape of the closure assembly will correspond to the shape of the container.

The ring 12 is preferably made of high or low density polyethylene, polypropylene or other plastic material which can be easily injection molded or thermoformed into a variety of shapes such as those illustrated in the drawings. The ring has a channel or groove 18 therein for receiving the peripheral edge of a container body and a flat sealing surface 20 opposite the channel.

Figure 2:
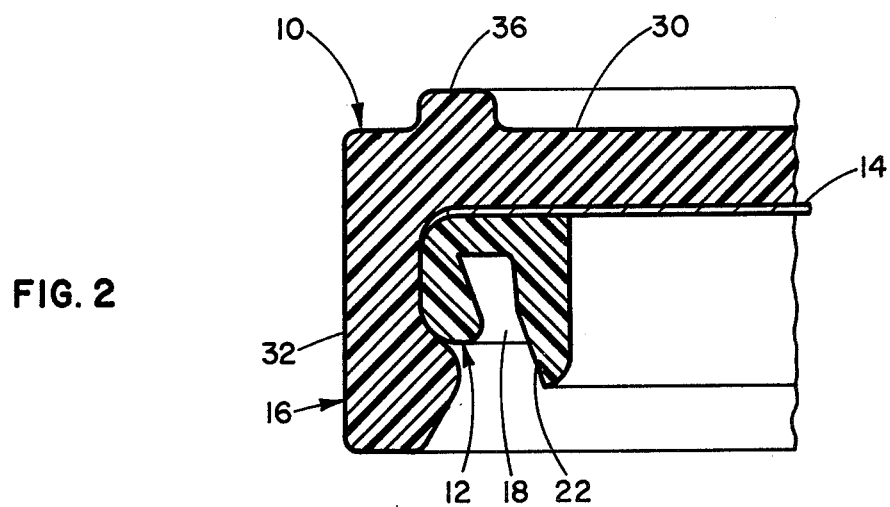
FIG. 2 is an enlarged cross section through an edge portion of a closure assembly of this invention.

The channel 18 in the sealing ring 12 is preferably inclined or angled with respect to the side wall of a container on which the closure assembly is to be sealed to turn the edge of the side wall outwardly as it is inserted in such channel. Thus, the channel 18 has a radially outwardly facing surface 22 therein which is generally frusto-conical in shape with increasing radial extent from the bottom edge 24 of the ring to the innermost surface 26 in the channel. Such angle of surface 22 helps to guide the ring 12 onto the peripheral edge of a container and seat the edge in the channel 18. The angle also produces pressure contact between the surface 22 and the inner surface of a container wall as will be explained. In the ring 12 which has been selected for purpose of illustration, the surface 22 includes a bottom portion which has a greater angle to vertical than the top portion of such surface 22. This helps to insure that the edge of a container will be guided into the channel 18 while minimizing the deflection of such container wall as seated in the channel. The sealing ring 12 further includes an outer shoulder 28 for engagement by a lip on the plastic overcap 16 to secure the overcap on the sealing ring as is seen in FIG. 2.

Disc 14 is made of metal foil, and preferably aluminum foil having a thickness in a range of approximately 0.001 to 0.006 inches. In thinner gauges, the foil may have a supporting layer of polyester film or paper on it to facilitate die cutting the foil and inserting the disc in an overcap. The foil disc preferably has a peelable heat seal coating on the surface thereof which will contact the flat surface 20 on ring 12. The coating system may include a base coating such as low density polyethylene and a top coating of water emulsion type ethylene vinyl acetate (EVA), solvent base gelled wax/EVA lacquer, wax/polyolefin or the like. The disc 14 may also have a non-peelable heat seal coating such as polyolefin on the surface thereof which will contact the undersurface of a plastic overcap 16. The presence or absence of such non-peelable coating will determine whether the foil membrane is removed from a container with the overcap or whether it will remain on the container when the overcap is removed. Both possibilities are considered to be within the scope of this invention.

The plastic overcap 16 which has been selected for illustration includes a top wall 30 and a depending skirt portion 32 with an inwardly projecting lip adjacent the bottom of the skirt for engaging under shoulder 28 on the sealing ring 12. The overcap 16 may also include a stacking rim 36 on its top wall 30 to help maintain alignment of a stac of such overcaps to facilitate handling the overcaps and sealing the caps on containers. The overcap 16 may be made of high or low density polyethylene, polypropylene or other resilient plastic material which can be injection molded or thermoformed and which will permit snap assembly of the overcap with a sealing ring.

A three piece closure of this invention may be assembled by first inserting the foil liner 14 in the overcap 16 and then inserting the sealing ring 12 in the overcap against the foil liner by resilient deflection of the overcap. The lip 34 on the overcap snaps under the shoulder 28 on the sealing ring to hold the assembly together for handling and shipment of the three-piece assembly.

Figure 3:
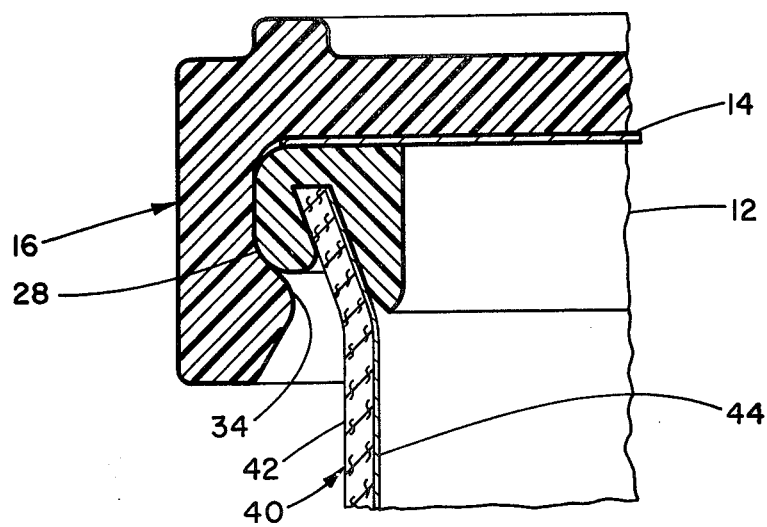
FIG. 3 is a cross sectional view through a closure assembly of this invention secured on a fibrous composite container.

A three piece closure assembly 10 of this invention is sealed on a composite container by positioning the assembly on the open end of such a container and sealing the ring 12 to the container and the foil disc 14 to the ring. The container and closure assembly are preferably selected with the inside diameter of the container equal to approximately the mean diameter of surface 22 in the sealing ring. Accordingly, in positioning the closure assembly on the container, the frusto-conical surface 22 on the sealing ring 12 will guide the peripheral edge of the container wall into the channel 18 to seat such edge in the channel. As the container wall is inserted in the channel 18, the edge of the container wall may be deflected outwardly to conform to the ring as is illustrated in FIG. 3. Alternatively or supplementally, the ring may be deflected slightly to accommodate the container wall depending on the relative rigidity of the container wall and ring. As positioned on the container, there will be interfacial pressure between surface 22 on the sealing ring 12 and the inside surface of the container wall. Such pressure will facilitate induction heat sealing at such interface as will be explained.

To seal the foil membrane 14 to the sealing ring 12, the foil is heated while pressed against the top surface of the ring. Heating of the foil is preferably effected by electrical eddy currents which are induced in the foil by an induction heating coil. Pressure of the foil against the sealing ring may be provided by pressure applied against the top of the closure assembly as supported by the container. The stacking ring 36 on the top of the overcap 16 helps to concentrate pressure of the foil membrane 14 against the flat surface 20 on the sealing ring 12 to facilitate proper sealing.

Depending on whether the foil 14 has a heat seal coating on its top surface, the foil may also be joined to the overcap at the same time as it is sealed to the sealing ring 12. In a preferred embodiment of this invention the foil liner 14 has a non-peelable coating on its top surface and a peelable coating on its undersurface. With such a liner, removal of the overcap from a sealed package will peel the liner from the sealing ring and thereby obviate any need to separately remove the liner from the package.

The ring 12 may also be sealed to the container wall by induction heating. As is illustrated in FIG. 3, a composite container may include a foil layer 44 on at least the interior surface of a paperboard layer 42 in the wall of the container. The inside surface of foil layer 44 may have a heat sealable adhesive such as polyethylene, surlyn or polypropylene film thereon, depending on the material of the sealing ring, for sealing the foil layer 44 to the surface 22 on the ring 12 when the foil layer is heated by electrically induced currents. Accordingly, such electrically induced currents will produce a seal between the sealing ring 12 and the container body 40, as well as between the sealing ring and the foil disc 14.

To open a container which has been sealed in accordance with this invention, the cover cap 16 is removed by resiliently releasing the lip 34 from under shoulder 28 on the sealing ring and lifting the overcap upwardly off the sealing ring. Removal of the overcap from the container and sealing ring may or may not also remove the foil disc 14 from the container depending on whether the foil disc has been secured on the undersurface of the overcap by a non-peelable coating. In one embodiment of this invention, the foil disc 14 is permanently secured to the undersurface of the overcap by a non-peelable coating and sealed on the ring 12 by a peelable coating so that removal of the overcap from the sealed container will peel the foil disc from the sealing ring. In another embodiment of this invention, the foil disc is not secured to the undersurface of the overcap and is not removed from the sealed container with such overcap. Instead, the foil disc is separately removed or torn open after the overcap has been removed from the sealed container.

Figure 4:
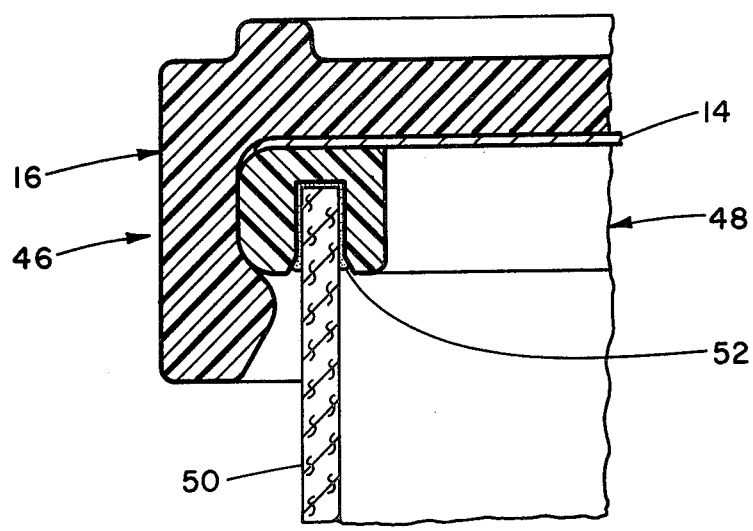
FIG. 4 is a cross sectional view through an alternative embodiment of a closure assembly of this invention secured on a fibrous container body.

FIG. 4 illustrates an alternative embodiment of a closure assembly 46 of this invention in which the groove in the sealing ring 48 has a hot melt 52 in it for sealing the closure assembly on a container wall. The hot melt is preferably deposited in the groove in a sealing ring in a melted condition, followed by positioning the closure assembly on a container wall. The closure assembly 46 is adapted for sealing fibrous or plastic containers not having a foil layer which can be heated by an induction heating coil.

It is seen that this invention provides an improved three-piece closure assembly which is especially adapted for sealing on fibrous containers. However, it will be apparent to those skilled in the art that this invention may also be practiced on containers made of other non-metallic materials such as plastic and glass. It will be further appreciated that although a preferred embodiment of this invention has been selected for purposes of illustration and description, that numerous modifications can be made in the invention without departing from the scope of the claims appended hereto. For example, it will be appreciated that the closure assembly and package may also be generally rectangular or oval as well as round. The overcap may also have a pull tab on its top wall or skirt to facilitate removal from a sealed package.

What is claimed is:

1. A closure assembly for sealing a container having a closed end and an open end and having a metal foil layer on the inside surface thereof with a heat seal resin on the foil layer, comprising a molded plastic sealing ring having inner and outer walls defining a channel therebetween for receiving and sealing against the foil layer at the open end of such a container, with said inner wall including an outwardly facing frusto-conical surface of increasing outward extent toward the bottom of the channel, said surface being adapted for exerting pressure against the foil layer in order to facilitate induction heat sealing of the ring thereto, a sealing surface defined by the top of the ring, and an outer shoulder below said sealing surface, a metal foil liner having an upper and lower surface and overlying said ring including said sealing surface thereon and disposed against such sealing surface, and having a heat seal coating on at least the outer portion of the lower surface thereof in contact with the sealing surface on the ring to be heat sealed to the ring upon induction heating of said liner, and a flexible plastic overcap having a top wall portion overlying said ring and liner and a depending skirt around the overcap with an inwardly projecting lip on said skirt engaged under the shoulder on said sealing ring.

2. A closure assembly as set forth in claim 1 in which said overcap has a flat undersurface on the top wall portion thereof, and said foil liner has a non-peelable heat seal coating thereon against said undersurface and a peelable heat seal coating on the surface thereof against said ring.

3. A package comprising a container having a closed end and an open end, and having a metal foil layer on the inside surface thereof with a heat seal resin on the foil layer, and a closure assembly sealed thereon including a preformed plastic sealing ring having inner and outer walls defining a channel therebetween in which the edge of the container at the open end thereof is seated and in which the foil layer is sealed, a sealing surface defined by the top of the ring, and a radially outwardly projecting shoulder below said sealing surface, a metal foil liner overlying the open end of the container and said sealing ring and sealed to said sealing surface, and a flexible plastic overcap having a top wall portion overlying said ring and liner and a depending skirt around the overcap with an inwardly projecting lip on the skirt engaged under said shoulder on said sealing ring.

4. A package as set forth in claim 3 in which said foil liner has a peelable coating sealing the liner to said ring and a non-peelable coating joining the liner to said overcap.

5. A package as set forth in claim 3 in which the inner wall of said sealing ring has an outwardly facing frusto-conical surface of increasing outward extent from the mouth of the channel to the innermost surface thereof.

* * * * *

UNITED STATES PATENT AND TRADEMARK OFFICE
CERTIFICATE OF CORRECTION

PATENT NO. : 4,094,460
DATED : June 13, 1978
INVENTOR(S) : Theodore P. Scanga et al It is certified that error appears in the above-identified patent and that said Letters Patent are hereby corrected as shown below:

| | |
|---|---|
| Col. 3, line 35 | Change "stac" to --stack--. |
| Col. 6, line 6 Claim 2 | Delete "a flat" and add --an--. |
| Col. 6, line 7 Claim 2 | After "thereof" insert --for mating with said sealing surface on the ring--. |

Signed and Sealed this

Twenty-sixth Day of December 1978

[SEAL]

Attest:

RUTH C. MASON
*Attesting Officer*

DONALD W. BANNER
*Commissioner of Patents and Trademarks*